Dec. 15, 1936.   A. A. FRIESTEDT   2,063,920
STEERING CONTROLLER
Filed Jan. 31, 1934   3 Sheets-Sheet 1
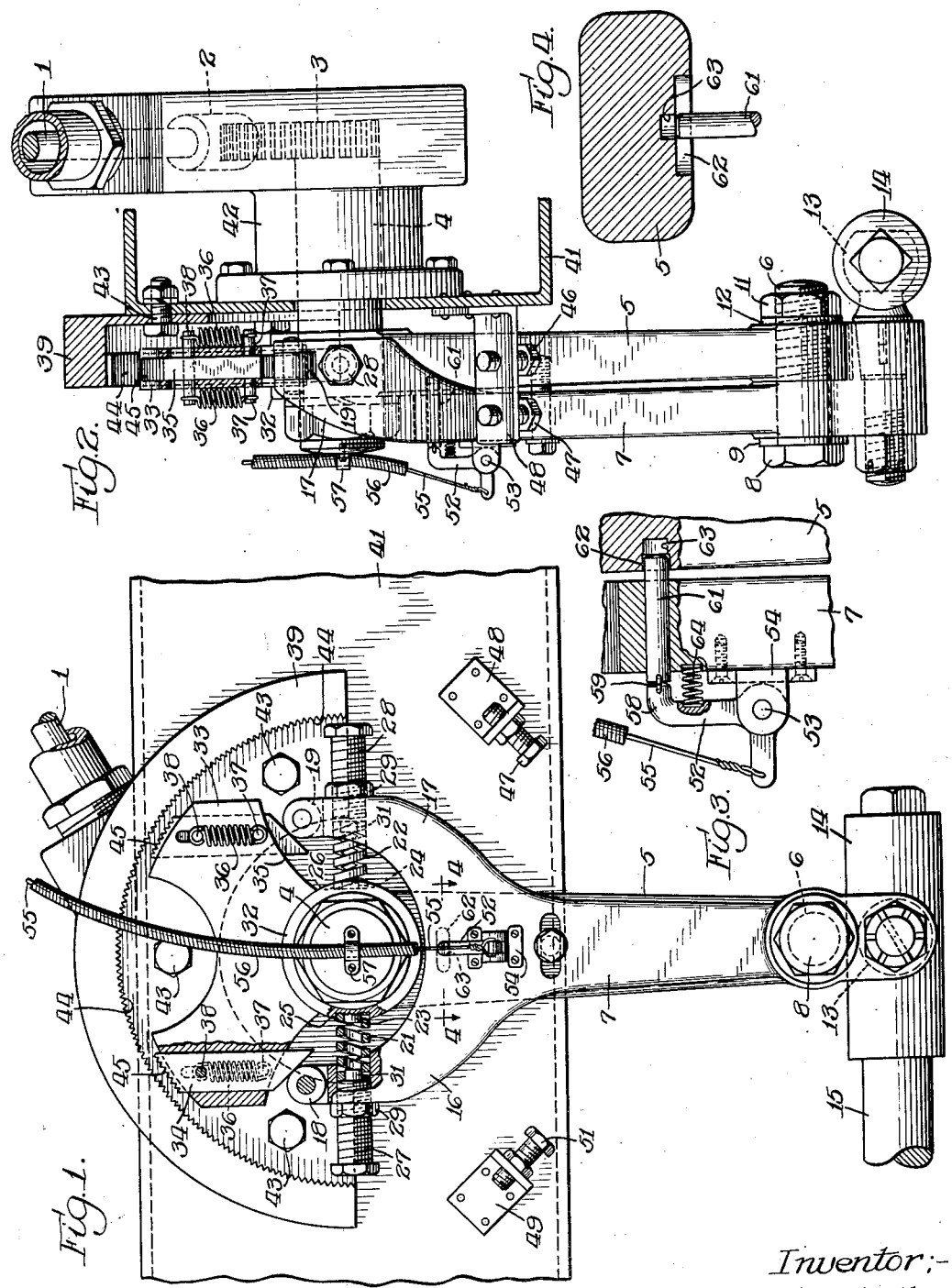
Inventor:-
Arthur A. Friestedt,
By Ira J. Wilson atty.

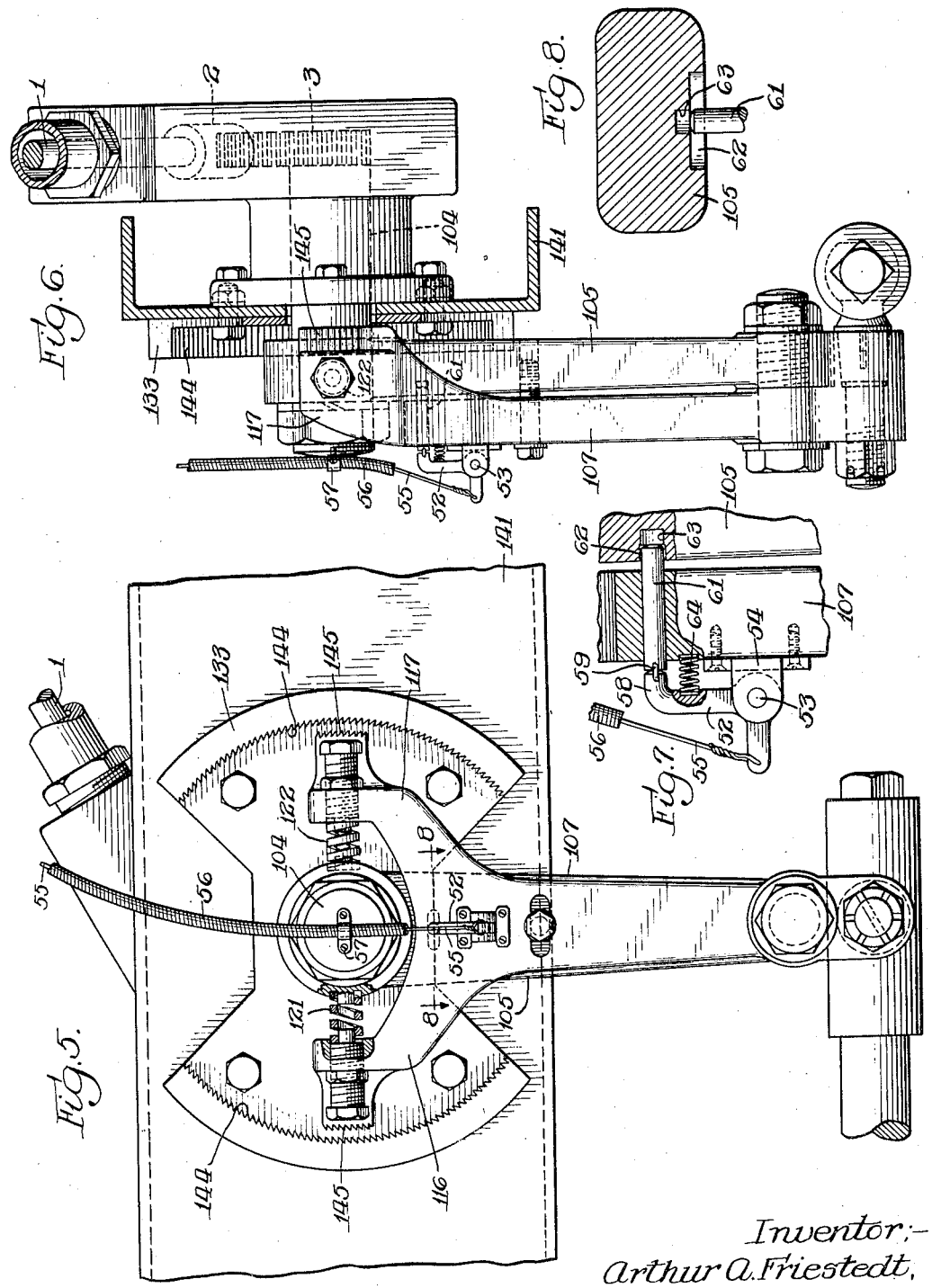

Dec. 15, 1936.  A. A. FRIESTEDT  2,063,920
STEERING CONTROLLER
Filed Jan. 31, 1934  3 Sheets-Sheet 3
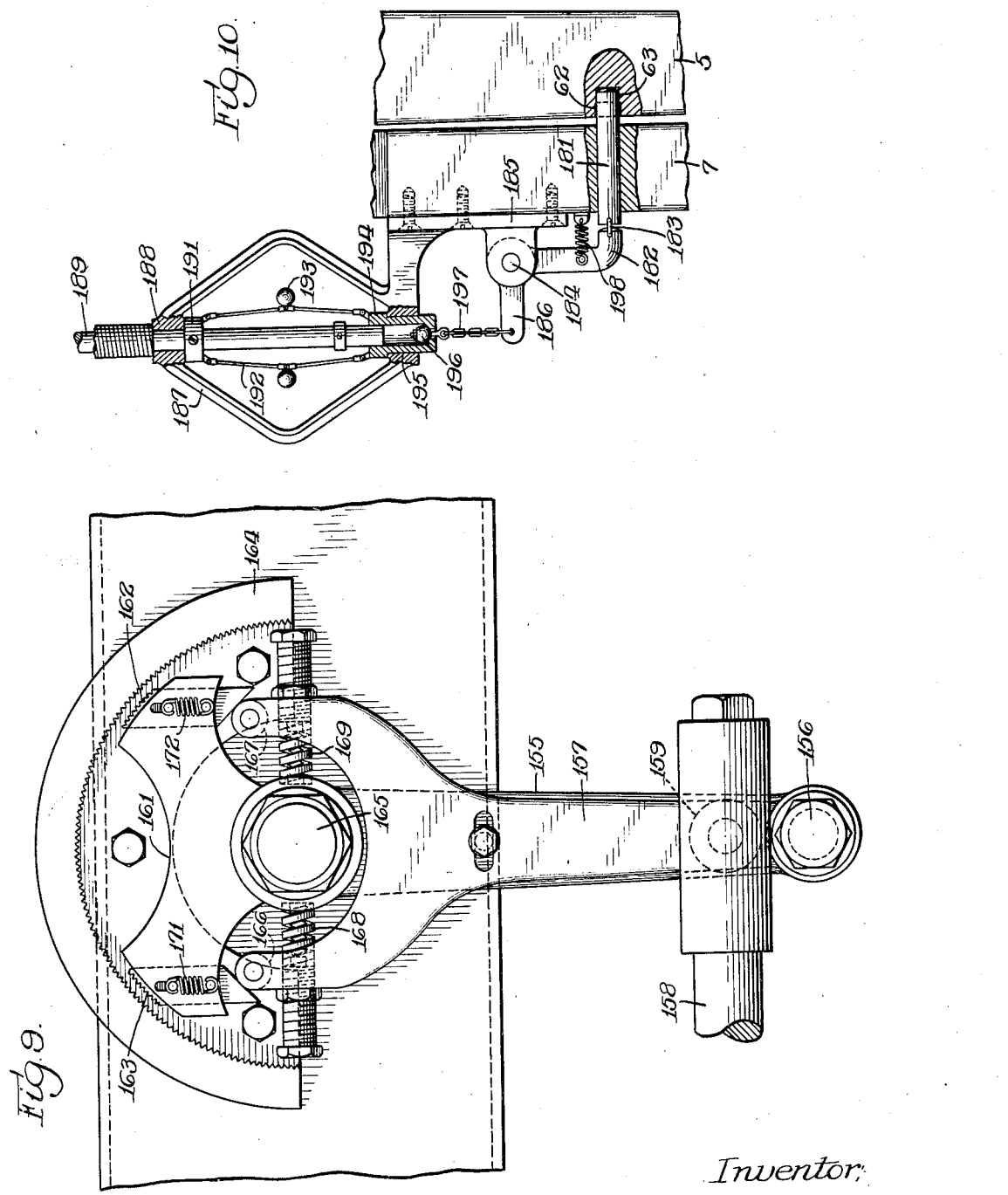
Inventor:
Arthur A. Friestedt,
By Ira J. Wilson Atty.

Patented Dec. 15, 1936

2,063,920

UNITED STATES PATENT OFFICE 2,063,920

STEERING CONTROLLER

Arthur A. Friestedt, McHenry, Ill.

Application January 31, 1934, Serial No. 709,088

19 Claims. (Cl. 280—89)

This invention pertains in general to improvements in steering apparatus for vehicles having dirigibly mounted running wheels.

The invention described herein constitutes a further improvement over my copending applications Serial No. 671,153, filed May 15, 1933, and Serial No. 671,154, filed May 15, 1933.

One of the particular objects of this invention is to provide improvements in cushioning of shocks which may be transmited from the running wheels back through the steering apparatus toward the manual steering wheel.

Another object of this invention is to provide improvements in the control of vehicle steering under normal driving conditions and under such emergency conditions as the blowing out of front tires or the encountering of holes in the roadway.

Various other objects and advantages of the invention will be described hereinafter in connection with the description of the invention.

Referring now to the drawings:

Fig. 1 is a front elevation of the mechanism embodying this invention,

Fig. 2 is an end elevation of the same,

Fig. 3 is a detail end elevation of the arm locking mechanism,

Fig. 4 is a horizontal section of the steering arm only on the line 4—4 of Fig. 1, Fig. 5 is a front elevation of a modified form of the invention, Fig. 6 is an end elevation of the same modification, Fig. 7 is a detail end elevation of the arm locking mechanism, Fig. 8 is a horizontal section of the steering arm only on the line 8—8 of Fig. 5, Fig. 9 is a front elevation of a third embodiment of this invention, and Fig. 10 is a side elevation of a governor controlled locking mechanism.

Referring now to Figs. 1 and 2, the usual automotive vehicle of today is provided with a shaft such as is shown herein and marked 1 on which is fixed a manual steering wheel (not shown). This shaft has at its lower end a worm 2 meshing with a sector gear 3 which is affixed to a sector shaft 4 for rotating the latter. This much of the construction as is now standard is employed in this invention.

Heretofore in the usual steering apparatus for automobiles there has been affixed to the sector shaft at its outer end an arm called a steering arm depending therefrom having a ball at its lower end which is inserted into a ball and socket joint at the rear end of a drag link, the forward end of which link is connected ordinarily to a steering knuckle connected with the left front wheel axle. In the present invention, however, a steering arm 5 is splined or otherwise affixed to the sector shaft 4 but does not carry a ball at its lower end. Instead it is connected by means of the pivot pin 6 to a control arm 7 whose function will later be described.

In order to secure these two arms in a snug pivotal relation without binding, the pivot pin 6 has a head 8 and is screwed into threads provided on the inside of the arm 5 but has no threads engaging the arm 7. The pin is screwed into the arm 5 far enough to bring the washer 9 snugly against the outside of the control arm 7 and thereafter a lock nut 11 and lock washer 12 secure this pin against further rotation.

The control arm 7 carries at its lower end, offset in the manner disclosed or depending straight below, if desired, a ball 13 enclosed within a drag link socket 14 of usual construction. The drag link 15 is shown only in part, it being understood that this drag link preferably extends forwardly from this position in accordance with the present practice and is connected to another ball on a bell crank, the rotation of which will effect the steering of the left front wheel and also the right front wheel, by means of interconnections between them which are too well known to require description and which in themselves do not form a part of this invention. It will suffice to say that forward movement of the drag link deflects the front running wheels to steer the car to the left, while rearward pull of the drag link from the position shown in Fig. 1 will steer the car to the right. Further, in accordance with the usual practice, the steering arm, when the front wheels point straight ahead, is vertical or approximately so, hence the position of the arms shown in Fig. 1 indicates their position for a car moving straight ahead.

The upper end of the control arm, as shown in Fig. 1, is bifurcated, providing two ears 16 and 17 on which are pivoted the rollers 18 and 19. Centering springs 21 and 22 engage at their inner ends with spring pilots 23 and 24 on opposite sides of the upper portion of the steering arm 5, in the center of recesses 25 and 26. The outer ends of the centering springs extend into passages in the ears 16 and 17, into which are threaded the spring tension adjustment screws 27 and 28 which are locked in any desired position by lock nuts 29. It will be noted that the set screws have pilots 31 which extend within the centering springs. It is evident that the springs may be removed and the set screws run in far enough to cause the pilots 31 to tightly abut the pilots 23 and 24 whereby the pair of arms are firmly locked in parallel position. Of course this same locked condition may be obtained if the springs are left in and are compressed by the set screws until a locked condition results.

It will now be apparent that the control arm and its centering springs will cause a large proportion of the road shock from the running wheels to be absorbed on the center line of the sector shaft, thence directly to the car frame. In actual practice no shock at all is noticed at the steering wheel.

Integral with the hub 32 of the steering arm 5 is a plate 33 having guide channels in which the pawls 34 and 35 slide. These pawls at their lower ends are beveled and are held in engagement with the rollers 18 and 19 by downwardly pulling springs 36, the latter being secured at their lower ends to pins 37 mounted on the plate 33 and at their upper ends to pins 38 carried by the slidable pawls.

A rack generally indicated as 39 is bolted preferably to the frame member 41 of the vehicle through which the sector shaft passes and on which the sector shaft housing 42 itself is bolted. Bolts 43 secure the rack to the frame 41. The rack is provided with a single row of uniformly cut teeth 44, preferably shaped so that radii extending out from the sector shaft axis to the bottom of the recess between adjoining teeth will be equidistant between the apexes of the teeth. Also teeth 45 cut in the same manner to register with the rack teeth are provided at the upper end of each pawl.

Steering of the vehicle to the right by the operator calls for rotating the pair of arms counter-clockwise and moving the drag link 15 rearwardly. Before the running wheels reach the extremity of deflection to the right, that is, before the steering knuckle on the right wheel bumps against the customary stop on the front axle, the arm 5 will strike the head of the stop screw 46 and the control arm 7 will strike the stop screw 47. These stop screws, as shown best in Fig. 2, are carried on a bracket 48 and, preferably, will be so adjusted that when the two arms are resting against their respective stop screws their longitudinal axes will then be parallel. Steering to the right thus will be limited at this point, and if the pawl 34 were just previously engaged with the rack at the time the two arms approach these rear stop screws, the control arm being in advance, will strike its stop screw first and further movement of the steering arm rearwardly to its stop screw will unlock the pawl 34.

A similar bracket 49 carries a pair of similar forwardly located stop screws for performing the same function in limiting left steering and unlocking the control arm, if necessary. The outer only of this pair of stop screws is visible in Fig. 1, and is there numbered 51.

In order that the driver of the vehicle may at will lock the control arm and steering arm in certain relationships, there is provided a bell crank 52 pivoted at 53 on a bracket 54 secured to the outside surface of the control arm 7, the lower end of which is connected to a flexible cable 55 which enters a flexible protective and guiding sleeve 56 secured by a bracket 57 to the outer end of the sector shaft. This cable and its sleeve then extends to some appropriate position in the vehicle, preferably at the dash, where the operator may conveniently reach it to operate the mechanism for the purposes hereinafter described. It will also be appreciated that instead of manual operation a governor of simple form may be employed to operate the flexible cable or the bell crank responsive to various speeds of the vehicle.

The bell crank at its upper end 58 is connected in any suitable manner, for example by means of a wire loop 59, to a cylindrical locking pin 61 which extends through a close fitting hole in the control arm 7 and which may, at the will of the operator when he pulls up on the cable 55, be extended into either the horizontally elongated slot 62 or the central hole 63 below the bottom of this slot. The length of the slot 62 with relation to the possible relative movements of the pin 61 and the steering arm 5 are such that when the pin is in the slot 62 the control and steering arms may not move relatively to each other far enough to enable either pawl to be pushed up into engagement with the rack teeth. Hence the feature of cushioning of the road shocks transmitted by the drag link and thence through the centering springs to the frame of the car will be retained when the pin is in the slot 62.

A further upward pull of the cable will cause the pin to enter the center hole 63, which is only slightly larger than the end of the pin. Obviously this will positively lock the two arms in parallel alignment and the centering springs will thereby be rendered inoperative.

Release of the cable will enable it to be pulled downwardly by the expanding action of the spring 64 mounted as shown, which will cause the pin to be withdrawn entirely from the hole 63 and the slot 62. Thereafter the arms may move freely relatively to each other and the pawls may engage the rack whenever the relative movement of the two arms is sufficient.

The cushioning function of the centering springs is, of course, lost when the arms are locked in alignment with each other, and, of course, the emergency locking feature is inoperative. However, locking of the arms in parallel alignment will be resorted to only when a car is standing or is moving at a very low rate of speed, that is, a few miles an hour. At higher speeds, that is, from perhaps five to twenty miles an hour it is preferred to utilize the centering or cushioning springs even though the emergency locking feature may not be employed. In this event the operator would withdraw the pin 61 until it merely engages with the elongated slot 62, which allows enough relative movement of the arms to permit this cushioning.

The modified form shown in Figs. 5 to 8, inclusive, is quite similar in principle to the preferred form shown in Figs. 1 to 4, inclusive. One outstanding difference is that instead of employing sliding pawls the teeth which engage the rack are formed integrally upon the control arms. For example, surrounding the sector shaft 104 and secured to the frame 141 of the car there is a rack 133 made in two sectors, each having a row of teeth 144. These teeth should be formed so as to have substantially the angles shown in Fig. 5. The pivotal connection between the steering arm 105 and the control arm 107 is obviously the same as in the preferred form and needs no further description. The ears 116 and 117 of the control arm carry the centering springs 121 and 122 in the same manner as in the preferred embodiment but these ears are then extended further outwardly and are provided with teeth 145 which obviously may be engaged with the rack teeth when the pair of arms are sufficiently out of alignment. The function of the modified form shown in Figs. 5 to 8 requires no detailed description in view of the description which has been given in connection with the preferred form, it being apparent that when the top of the control arm leans far enough to the left the rack teeth will be engaged by the left ear 116 and counterclockwise rotation of the sector shaft will be prevented. It will be here noted that when the top of the control arm in Fig. 1 moves far enough to the left, the right hand slidable dog engages the rack and thereupon prevents counterclockwise rotation of the sector shaft.

The manual or selective locking mechanism employed with the device of Fig. 5 is identical with that shown in Fig. 3.

The device shown in Figs. 5 to 8, inclusive, likewise affords a normally unlocked but normally cushioned steering condition, the road shocks being cushioned through the centering springs 121 and 122.

Referring to the device shown in Figs. 1 to 4, inclusive, it will be observed that if the centering springs have considerable strength the control arm, during ordinary steering of a moving vehicle, will never swing out of alignment far enough to thrust either pawl into the rack. The centering springs are aided somewhat in this respect by the downward pull of the springs which are attached to the pawls, as they thrust the pawls against the rollers 18 and 19 on the control arm. The combined strength of all these springs required for preventing engagement of the pawls under ordinary driving conditions is a matter which can readily be determined and attained in actual practice by substitution of springs and by adjusting the tension screws on the control arms.

Should there arise a thrust from either front wheel which is strong enough to cause either pawl to become engaged with the rack, or should the resistance to intentional steering be strong enough to cause engagement of either pawl with the rack, the shape of the teeth and the relation of the various parts in the embodiment shown in Fig. 1 are preferably such that the operator of the vehicle can rotate the steering arm in either direction he desires if, by means of the steering wheel, he can apply enough pressure to force the engaged pawl out of engagement with the teeth and down against the associated roller. This effort to disengage the pawl from the rack will be aided at the time by the centering spring which is under the greatest compression. If the driver desires to steer the car further in the direction which the running wheel thrust tends to turn it, rotation of the steering wheel to accomplish that purpose will tend to reverse the existing alignment of the control and steering arms and thus facilitate the release of pressure on the engaged pawl. But should the driver desire to steer the car in a direction opposite to the tendency which the running wheel thrust then has he cannot cause the pawl to be released unless he is able to exert sufficient power through the steering wheel to offset both the road thrust and the resistance existing in the steering control mechanism. It is apparent that he should not be able to unlock the pawl if the road thrust is beyond his power to control, for to do so would be to destroy the protection which the device is then affording him and create a steering condition which would get beyond his control. In other words, if after a locked condition occurs the driver has sufficient power through the steering wheel actually to control the steering, this device will enable him to do so, but if his strength is insufficient to control the steering, the device will prevent him from unlocking the mechanism.

The embodiment shown in Fig. 9 differs from that of Fig. 1, principally in having its drag link connected above the pivot of the two arms rather than below. As shown in Fig. 9 the steering arm 155 is connected at the pivot 156 to the control arm 157 but the drag link 158 is connected to a ball 159 mounted on the side of the control arm above the pivot. The upper end of the steering arm carries integrally therewith a bracket 161 which provides slidable bearings for pawls 162 and 163. The lower ends of these pawls are beveled oppositely to the pawls of Fig. 1 to compensate for the difference in the connection of the drag link to the control arm. This device also operates in connection with a rack 164, the teeth of which are formed as in Fig. 1 concentrically about the sector shaft 165, the pawls being slid by the rollers 166 or 167. Centering springs 168 and 169 operate just as do the centering springs of Figs. 1 and 5, while the pawls are urged downwardly by springs 171 and 172. The functioning of this device requires no further description in view of its similarity in principle to the device of Fig. 1.

The governor controlled locking device shown in Fig. 10 may be substituted for the manually controlled locking device shown in Fig. 3. It will be mounted on the outside surface of the control arm 7. A slidable locking pin 181 extends through the control arm 7 and may be thrust into locking recesses such as the small hole 63 and horizontally elongated slot 62, similar to those shown in Fig. 4. A bell crank having one arm 182 is connected by a link 183 to this pin and is pivoted at 184 on a bracket 185 mounted in the control arm. The other arm 186 of the bell crank is connected to the speed controlled governor.

This governor has a casing 187 mounted on the same bracket 185 as is the bell crank, and provides a bearing 188 through which a rotating governor shaft extends. This shaft is connected by a flexible shaft to some portion of the vehicle which is rotating when the car is moving, but is stationary when the car is stopped, whether or not the motor is idling. For example, the governor shaft may be geared to the drive shaft of the automobile which drives the differential gears. The means for making such a connection is easily within the skill of those who work in this field, and requires no specific description here. On the governor shaft 189 is fixed a collar 191 to rotate therewith and to this collar are pivotally connected a plurality of the usual flexible links 192 carrying governor balls 193, the links being connected at their lower ends to a sliding collar 194, which rotates with the links but may slide longitudinally on the rotating shaft. A cylindrical yoke 195 rotates with the collar 194 and carries at its bottom end a swivel 196 to which is connected a non-rotating wire or chain 197, the latter being connected to the bell crank as shown. It is intended that this governor will be so adjusted that whenever the car is standing still the spring 198 will pull the bell crank inwardly and thrust the pin 181 into the center hole 163, locking the control and steering arms together. After the car has attained a speed of perhaps five miles an hour the governor will withdraw the pin until it rests in the elongated slot 62, thus permitting the arms to move relatively to each other a limited amount, permitting the centering springs to function as shock absorbing devices but preventing the control arm from moving far enough to thrust either pawl up into the rack. After the car has attained a speed of twenty or twenty-five miles per hour, at which time the safety feature afforded by the pawls may be required, the governor will withdraw the pin 181 entirely from engagement with the arm 5.

While the drawings show and the specification discloses the preferred manner of constructing and using the invention in several forms thereof, it should be understood that various changes may be made in each embodiment and that other embodiments may be constructed, all within the scope of the invention.

I claim:

1. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means normally holding said arms parallel connected to the control arm adjacent said shaft and supported upon said steering arm near the center line of the shaft, a stationary arcuate rack concentric with said shaft, a pawl slidably mounted and movable bodily with one of said arms, and means connected with the other arm for sliding said pawl into engagement with said rack.

2. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means normally holding said arms parallel connected to the control and steering arms adjacent said shaft, an arcuate rack concentric with said shaft and fixed on the vehicle, a pawl slidably mounted for bodily movement with said shaft as the latter rotates, and means connected with the control arm for sliding said pawl into engagement with said rack.

3. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means normally holding said arms parallel connected to the control and steering arms adjacent said shaft, a rack concentric with said shaft fixed upon the vehicle, a pair of pawls slidably mounted for rotation with said shaft, and means connected with the control arm for sliding either of said pawls at certain non-parallel positions of the two arms into engagement with said rack to restrain thereby rotation of said shaft.

4. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means normally holding said arms parallel connected to the control and steering arms adjacent said shaft, a rack concentric with said shaft and carried by said vehicle, and means carried by said control arm for engaging said rack in certain non-parallel positions of the two arms.

5. In a vehicle steering apparatus, a shaft and means controllable by an operator for rotating the same, a steering arm fixed on said shaft for oscillation thereby, a control arm pivoted to said steering arm remotely from said shaft extending both sides of said pivot, a drag link connected to said control arm adjacent said pivot, means for resiliently holding said arms normally in parallel alignment, and means fixed on the vehicle to be struck by one of said arms only near the maximum swinging limits of said arms constructed for restoring them to parallel alignment when they reach said limits.

6. In a vehicle steering apparatus having dirigible running wheels and a drag link connected thereto, a pair of arms pivotally connected together adjacent corresponding ends of both, means bearing on both near their opposite ends for holding them resiliently in parallel alignment, one of said arms being manually oscillatable by the operator for steering purposes, the other arm being connectible to said drag link, and means fixed on the vehicle to be struck by one of said arms near the limits of its oscillation in either direction for restoring the arms at such position into parallel alignment.

7. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means normally holding said arms parallel, an arcuate rack concentric with said shaft and fixed on the vehicle, a pawl slidably mounted for bodily movement with said shaft as the latter rotates, and means connected with the control arm for positively forcing said pawl against said rack.

8. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means normally holding said arms parallel, a rack concentric with said shaft fixed upon the vehicle, a pair of pawls slidably mounted for rotation with said shaft, and means connected with the control arm for sliding either of said pawls at certain non-parallel positions of the two arms into engagement with said rack to restrain thereby rotation of said shaft, said pawls being mounted to slide substantially parallel to the steering arm.

9. In a vehicle steering apparatus, a manually operable steering wheel, a horizontal shaft rotatable by said wheel, a steering arm affixed to said shaft and depending therefrom, a control arm pivotally connected with the lower end portion of the steering arm extending above and below said pivot, means for connecting a steering drag link to the lower end of said control arm, an arcuate member mounted concentrically with said shaft, an element slidably mounted and bodily movable with one of said arms for engaging said member, means connected with the other arm for effecting engagement of said element and member, and resilient means bearing upon both arms for normally holding said arms in parallel alignment.

10. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, an arcuate member mounted concentrically with said shaft, an element slidably mounted and bodily movable with one of said arms for engaging said member, means connected with the other arm for effecting engagement of said element and member, and resilient means normally holding said arms parallel.

11. In a vehicle steering apparatus, a shaft and means for manually rotating it, a steering arm affixed at one end thereof to said shaft, a control arm pivotally connected with the other end of said steering arm intermediate its own ends, means for connecting a steering link to one end of said control arm, an arcuate member mounted concentrically with said shaft, an element slidably mounted and bodily movable with one of said arms for engaging said member, means connected with the other arm for effecting engagement of said element and member, and means resiliently acting upon the other end portion of said control arm and upon said steering arm for normally holding said arms in parallel alignment.

12. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means for normally holding said arms parallel connected to the control and steering arms, a rack concentric with said shaft and carried by said vehicle, and means carried by said control arm for engaging said rack in certain non-parallel positions of the two arms.

13. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means for normally holding said arms parallel, and means providing motion checking members concentrically arranged about said shaft to be engaged by said control arm in certain non-parallel positions of the two arms for preventing rotation of said shaft.

14. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means for normally holding said arms parallel, one end of said control arm having bifurcated branches normally moving concentrically about said shaft during normal steering movements, and means carried by the vehicle engageable by said branches in certain non-parallel positions of said arms for checking the rotation of said shaft.

15. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means for normally holding said arms parallel, one end of said control arm having bifurcated branches normally moving concentrically about said shaft during normal steering movements, and motion checking means having projections arranged concentrically about said shaft engageable by said control arm in certain non-parallel positions of the two arms for checking rotation of the shaft.

16. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means for normally holding said arms parallel, the end of said control arm nearest said shaft having bifurcations lying on opposite sides of said shaft, and means concentrically disposed about said shaft engageable by said bifurcations in certain non-parallel positions of the two arms for restraining rotation of said shaft.

17. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means for normally holding said arms parallel, the end of said control arm nearest said shaft having bifurcations lying on opposite sides of said shaft, stationary checking means disposed concentrically about said shaft, and means slidably operated by said bifurcations in certain non-parallel positions of said arms for engaging said checking means to check rotation of said shaft.

18. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means for normally holding said arms parallel, checking means concentrically disposed about said shaft, and slidable means operated by said control arm in certain non-parallel positions of the two arms to engage said checking means to check rotation of said shaft.

19. In a vehicle steering apparatus, a shaft and means controllable at the will of the operator for rotating the same, a steering arm affixed on said shaft near one of its ends, a control arm pivoted to the other end of said steering arm extending both sides of said pivot, a drag link connected to the control arm close to the pivot, resilient means for normally holding said arms parallel, the end of said control arm adjoining said shaft being bifurcated, checking means having projections concentrally disposed relatively to the axis of said shaft engageable by said bifurcations in certain non-parallel positions of said arms for checking rotation of said shaft.

ARTHUR A. FRIESTEDT.